Figure 1:
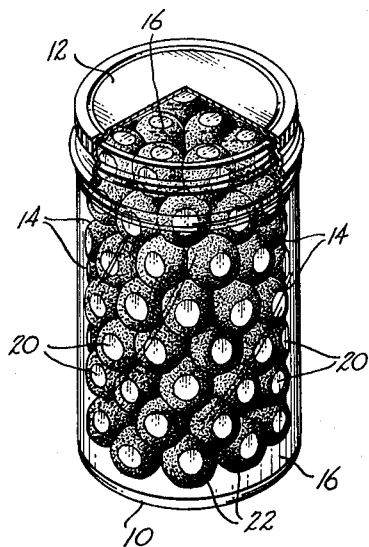

Nov. 22, 1960   J. T. STEPHAN   2,961,319
PROCESS OF DYEING BAIT FISH EGGS WHILE COMPRESSED
TOGETHER, AND BAIT EGGS FORMED THEREBY
Filed Jan. 29, 1959

INVENTOR.
JOHN T. STEPHAN

BY Mathis and Graybeal
ATTORNEYS

2,961,319

PROCESS OF DYEING BAIT FISH EGGS WHILE COMPRESSED TOGETHER, AND BAIT EGGS FORMED THEREBY

John Thomas Stephan, 1745 Harbor Ave. SW., Seattle, Wash.

Filed Jan. 29, 1959, Ser. No. 789,853

23 Claims. (Cl. 99—3)

The present invention relates to improved processes of dyeing bait fish eggs, to bait fish eggs having distinctive multi-tone color patterns formed by such processes, and more particularly relates to multi-tone bait salmon eggs artificially colored to present a coloring pattern where each egg has several separate, discrete, substantially circular areas of one color tone with the remaining surface area of the egg having another color tone, and to processes for imparting such color patterns.

A related aspect of the present invention involves improved packaging and dyeing techniques for bait eggs, and an improved so-called "wet pack" solution of a comparatively viscous character serving as a dye carrier and also serving as a water leachable fish attractant in use.

Conventional practices in hardening and artificially coloring salmon eggs adopt a variety of processing techniques and, manifestly, many variations are available both in the hardening phase and the dyeing phase of the processing. The fish eggs in their natural state are recovered from a fish during the canning process and are usually initially preserved in a sodium chloride solution under refrigeration at 40° to 45° F. until such time as ready for processing. Processing generally involves a hardening treatment such as by steam cooking or by treatment with a hardening agent such as formaldehyde, or both. Sellen U.S. Patent 1,703,324 typifies such processing. Hot salt solutions have also been used to harden or "cure" the eggs, for an example of which practice see Tereski, U.S. Patent 2,743,185. The eggs in addition can be subjected to an acid enlargement process, such as disclosed in my copending issued Patent Number 2,951,761, entitled "Improved Fish Bait." Enlargement techniques involving alkaline treatment are also known.

After hardening with or without enlargement, the eggs are usually but not necessarily also subjected to a dyeing process to give an artificial color thereto and enhance their otherwise generally translucent appearance and can be colored artificially by either any fluorescent or any non-fluorescent dye capable of exhausting onto the protein of the egg from aqueous solution. Some typical fluorescent dyes of this character and for this purpose are disclosed in my aforesaid application and in the copending application of Steve Sarich, Jr., Serial No. 467,893, filed November 9, 1954, entitled "Improved Fish Bait." Dyeing the processed eggs with a non-fluorescent dye is likewise typically disclosed in Fishery Leaflet 28 (published by the U.S. Department of Interior, 1946) at pages 17 and 18.

Eggs from various fish sources can be used as bait eggs, such as the various species of salmon (king, chum, silver, pink and sockeye). Eggs from other fish such as halibut, sturgeon, cod or any other variety of salt water or fresh water fish can also be used depending on the end use to which the bait is to be put.

The foregoing typical and therefore incomplete and non-limitive examples of available sources of bait eggs and common techniques as to processing bait eggs by hardening, enlargement and/or artificial coloring thereof, including the typical suitable dyes disclosed in connection with the latter step, serve to illustrate that regardless of the manner of hardening and particular manner of artificial coloring heretofore involved, the dyeing step of the processing has involved the exhausting of a selected color onto the egg, with the dye introduced to the eggs in hot aqueous solution as a last step of the hardening and/or enlargement treatment. This is true whether the selected dye is of the non-fluorescent type such as the aniline dyes safrennin or Sherwin Williams 3–R, as disclosed in said Fisheries Leaflet 28, or is of a type having fluorescent or phosphorescent characteristics as disclosed in the aforesaid pending applications of Steve Sarich, Jr. and myself.

The present invention constitutes an improvement applicable to any of the aforesaid such processing techniques and provides in the art a procedure for modifying the dyeing step of the treatment to produce bait eggs having distinctive multitone color patterns.

According to the present invention, the bait eggs are hardened, enlarged and/or dyed to retain or impart a first, preferably comparatively light color, as desired, and are then placed in a chamber which may or may not be the container in which the bait eggs are marketed, and a preferably viscous dye carrier solution is added to the container in such a way as to fill the voids between the individual eggs, the color of the dye in the dye carrier solution being of a contrasting, usually darker color. Obviously, the eggs or the dye carrier solution can be introduced to the chamber in any order. With the eggs and dye carrier solution in the chamber, mechanical pressure is then applied to the chamber to reduce the overall volume of the eggs substantially (preferably on the order of 5–20% volume compression), whereby the points of contact of the eggs with one another and with the inner wall of the chamber are flattened, effectively squeezing out any of the dye solution between the areas of contact. Under such compression, the eggs are no longer substantially spherical in shape, but are deformed by flattening at the areas of contact, the respective areas of contact between the eggs and/or the container, as the case may be, being substantially planar.

When thus held under mechanical compression, the dye contained in the dye solution in which the eggs are immersed will not reach the aforesaid areas of contact, and will at least partially exhaust onto the surface portions of the egg which remain exposed to such solution, resulting in eggs which have a multi-tone, distinctive coloring pattern characteristic of the present invention, namely several (usually about eight) discrete, separated, discontinuous, substantially circular areas of a first color tone, with the connected area therebetween, i.e. the remaining surface area of the egg, being of a contrasting color tone.

The distinctive type of coloring pattern imparted to the bait eggs by dyeing them with a second color tone while the eggs are mechanically compressed together creates a coloring pattern in the eggs which renders them strikingly similar in appearance to the veined pattern of eggs as often occurs in the eggs in their natural state and in natural clusters of eggs as they occur in skeins. This artificially created yet quite natural appearing veined coloring pattern creates a bait egg which is distinctive as to type, with a comparatively large number of contrasting color boundaries, and with quite sharp color delineation at such color boundaries. Further, due to the somewhat random nature of the size of bait eggs as they occur commercially, even though sorted, the degree of compression and resulting size of the areas of contact between the eggs and/or the chamber will vary somewhat, with the result that no bait egg has a coloring pattern exactly like the pattern of any other egg, thus also contributing to a degree to the overall naturalness in appearance of any given egg or group of eggs.

Figure 2:
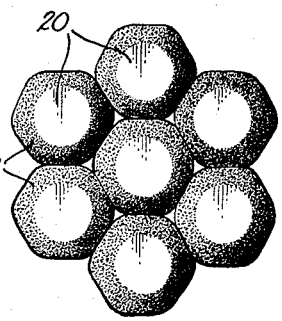
Figure 3:
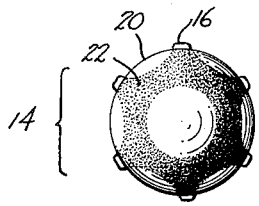

To illustrate certain characteristics of my bait eggs and a typical process of forming same, as well as the unique coloring pattern thereof, reference is made to the accompanying drawings, wherein like numerals refer to like parts, and wherein:

Fig. 1 is a perspective view of a capped, jar type container of the nature in which bait eggs are conventionally marketed, having a portion of the cap and the upper lip of the jar broken away to illustrate the relation of the contained bait eggs to the container cap and to the viscous dye carrier solution, and the compressed nature of the bait eggs;

Fig. 2 is an enlarged view of several eggs compressed together, showing in more detail the nature of the relative contact therebetween and the nature of the substantially planar areas of contact formed; and Fig. 3 is a view of a single egg after removal thereof from the container, showing its restoration to the form substantially of a spheroid and showing the formed coloring pattern, as well as a representation of the viscous coating adhering to at least portions of the egg.

Considering further the illustrated views of a typical "pack" and the nature of the compressed positions of the eggs when packed, as well as the nature of a bait egg characteristic of the present invention in use, as illustrated in Figs. 1–3, glass jar 10 containing the "pack" has firmly screwed thereon metal cap 12, the bait eggs 14 in the process of being packed having first been placed in the jar 10 in sufficient number to fill the jar 10 with a layer of the eggs 14 extending almost entirely above the upper lip of jar 10. With the quantity of eggs thus being sufficient to slightly overfill the jar 10, a preferably viscous second dye solution 16 containing a darker color than the original color of the eggs when packed is poured into jar 10 to fill the same almost to the upper lip thereof, after which the cap 12 is applied to the eggs and screwed down onto the threads at the upper lip of jar 10, resulting in the compression of the eggs 14 to substantially the form indicated.

As will be noted, the eggs when compressed together and to the sides of the jar 10 are squashed at various areas, which areas are thereby rendered substantially planar, certain of such areas being indicated at 20. The remaining areas of the bait eggs, certain of which are indicated at 22 are exposed to the dye of the viscous solution 16, while contacting areas 20 are masked or shielded from the dye solution and no dye from the solution will exhaust thereon.

When the jar 10 is opened by removal of cap 12 to expose the eggs for use, the eggs are relieved of the compressive pressure and will restore at least partially to their essentially spheroidal shape, as shown at Fig. 3, with the egg having several (usually eight but sometimes fewer) substantially circular areas 20 of lighter color tone (shown without stippling) while the remaining area 22 of the egg is of a darker color tone (shown stippled), some of the viscous solution 16 adhering as a coating primarily to the area 22 of the egg.

Having now considered the physical nature of one form of maintaining bait eggs under mechanical compression while a contracting dye is exhausted unto only the exposed areas of the eggs, consideration will now be given to further and more detailed examples of modes of practice of the present invention. While the present invention is not limited to use of any particular dye or coloring or combination of colorings in developing the coloring pattern characteristic of the present invention, one particularly attractive coloring pattern I have utilized in practice of the invention involves first coloring the eggs with a light yellow dye such as saffron-yellow, then using a synthetic blood as the viscous dye carrier solution, creating what I term a "blood egg."

In formulating the synthetic blood solution to serve as the viscous dye carrier solution, and by way of typical example, I use 15 cps. grade methyl cellulose (Methocel, Dow Chemical Company) in the amount of 20 pounds, with 80 pounds of water at 190° F., 2180 cc., 5% Valentine Red solution (a 3.7% solution of FD & C #2, marketed by the Crescent Manufacturing Company, Seattle, Washington), 279 pounds cold tap water, and 1000 cc. Roccal preservative solution (alkyl dimethyl benzyl ammonium chloride solution). The methyl cellulose is slurried in the hot water in which it is only partly soluble. The cold water is then added together with the dye and the methyl cellulose swells, giving a viscous solution. The viscous solution is then stirred for approximately one hour to remove lumps, and allowed to stand for about 24 hours in order to complete the dispersion of the solution, after which the preservative solution is added and the resulting "blood" solution drummed.

When the bait eggs are packed, about 1 oz. of the blood solution is placed in a 2 oz. jar and warm or hot eggs are added to overfill the jar, then the jar cap is placed and tightened, the blood solution occupying the space among the eggs and the eggs being mechanically compressed together and against the sides of the jar, in the manner discussed in connection with Figs. 1 and 2.

By the above procedure, sufficient amount of red dye is present in the viscous dye carrier solution so that soon after packing substantially all of the dye is exhausted from the carrier solution, resulting in the packing solution having a transparent or at least somewhat translucent appearance, as viewed by the consumer.

It is important that the carrier solution be approximately isotonic with respect to the eggs (about pH 5 when the eggs have been enlarged by acidulation) in order to avoid undue change in dimension of the eggs in the pack. In this respect, however, the permitting of some swelling of the eggs (by favoring a slightly acidic condition) is actually beneficial because it increases the closeness of the packing of the eggs and the pressure contact at the masked egg surfaces.

As water is transferred from the carrier solution to the eggs in the pack, there is deposited on the surfaces of the egg a quite viscous layer of methyl cellulose, rendering the eggs more slimy, with the "blood" adhering better to the egg and milking into the stream for a longer time in use.

In connection with the above example, it is to be noted that there is no criticality as to the type of dye used, that other synthetic resins or like materials such as hydroxyethyl cellulose, polyvinyl alcohol, similar synthetic polymer, or natural or modified natural materials such as cooked starch, dextrine, chemically modified starch, natural gums, or beef blood or similar animal blood containing appropriate preservatives can be used as the viscous carrier for the dye exhausting onto the exposed areas of the eggs and for the egg adherent leachable material. Further materials usable as the viscous ingredient to the carrier solution in the example earlier presented are natural alginates, such as obtained from seaweed and kelp, glucose solutions, gelatin, hydrolyzed fish protein and the like.

It has also been found advantageous to add a fish attracting odorant material to the carrier solution in many instances. To illustrate, the cold or hot tap water to be used in making up the viscous solution, prior to its use in the formulation can have slurried therewith crude herring oil, or clam extract or baby squid nectar or extract, or the like, and the cold water will pick up sufficient amounts of the odorous materials in such oil or extract to impart definite fish attracting odorant characteristic to the viscous coating on the eggs in use and to the eggs themselves.

When a viscous dye carrier solution is desired, it will be apparent that wide variation is possible as to the viscosity of the solution. In practice I have found it desirable to have a carrier solution having a viscosity of at least about 10 cps. (at 70° F.) should be used to minimize any tendency of the solution to migrate by capillary movement into the masked egg areas when the pack is stored for an extended time. On the other hand, relatively viscous solutions of up to about 1000 cps. (at 70° F.) viscosity can be used and are often preferable, the important consideration in this respect being that the solution have sufficient "flow" to fill the interstitial spaces in the egg pack.

As yet another example of a commercial form of practice of the present invention, the typical formulation above presented was modified to utilize a green dye in the viscous carrier solution rather than a red dye, to create what I term a "frog egg."

The specific green dye employed in this example was formulated by mixing one part of Flag Blue Shade dye solution (a 1.9% solution of FD & C Blue #1, marketed by the Crescent Manufacturing Company, Seattle, Washington) with two parts Yellow dye (a 2.6% solution of FD & C Yellow #5, also marketed by the Crescent Manufacturing Company). With eggs given a first artificial coloring of light yellow, then packing of the eggs as before with the green dye in the viscous dye carrier solution 16, a multi-tone effect of yellow substantially circular areas 20 on green area 22 resulted, giving a particularly attractive egg in certain areas of use of bait fish eggs, such as fresh stream casting.

While the foregoing examples relate essentially to the process of generating the mechanical compression to deform the eggs with substantial contacting areas therebetween by compressive packing thereof into the type of container in which they are marketed, it will be readily understood that the processing techniques of the present invention are not limited thereto. Thus, by way of further example as to modes of preparation of eggs having the coloring pattern characteristic of the present invention, a large, closable foraminous chamber or container can be employed, such as in the following manner.

Assuming that the eggs have been previously hardened, enlarged and/or dyed with a selected light color, approximately two gallons of eggs are placed in a closeable, mesh screen container in sufficient amount so that the container when closed will establish the appropriate deformation among the eggs. With the container closed and with the eggs compressed therein, the foraminous container is placed in an aqueous solution containing a darker dye and left therein for a sufficient time for the darker dye to exhaust substantially onto the exposed surfaces of the eggs, i.e. from about 30 minutes to about 24 hours depending on the solution temperature and the concentration of the darker dye in the solution. The container is then removed from the darker dye solution and rinsed, then the eggs removed from the container and drained as in screen boxes, following which the eggs are "dry" packed in the containers in which they are marketed. In this manner of processing, it will be of course understood that the solution containing the darker dye is not of a viscous nature, and that the eggs in dry pack as marketed will not include a viscous coating. It will be nonetheless apparent, however, that the eggs have imparted thereto basically the same characteristic coloring pattern as evolved by the earlier discussed packing procedure, since in either event the eggs when exposed to the darker dye solution are maintained in compressive contact substantially flattening various surface areas thereof, which flattened areas are not reached by the second dye.

This latter dyeing procedure has the advantage of handling the eggs in relatively large volume, while the dyeing procedure first set forth has the advantage of accomplishing the mechanical compression necessary to form the color pattern directly in the container in which the eggs are ultimately marketed.

While the foregoing examples involve water soluble dyes and aqueous dye systems generally, it will also be understood that an alcohol soluble water insoluble dye and dye carrier solution, i.e. an alcohol dye system, can be used equally well, should greater water insolubility be desired as to the dye and as to the viscous coating, when present.

As will also be readily understood, considerable variation is available, as desired, as respects the degree of flattening occasioned in the contacting areas of the eggs when under compression, with flat areas being from about 20% to about 80% of the total surface area of the average egg as a commercial practicality. For most purposes, a ratio of about 50% in this respect is commercially suitable since such provides substantially equal total color areas in the color pattern.

Other variations and manifestations of the invention will readily occur to those skilled in the art, within the scope of the following claims.

What is claimed is:

1. A bait fish egg with a plurality of separated, discrete, substantially circular areas of one color tone and with the connected area therebetween of another color tone.

2. A bait fish egg having a surface coloring pattern consisting essentially of several discrete, substantially circular areas of a comparatively light color, the remaining area of the coloring pattern being of a substantially darker color, with well defined boundary lines between said colors.

3. A bait fish egg according to claim 2, further comprising a viscous coating adhering to the darker color area.

4. A bait fish egg according to claim 3 wherein said viscous coating is water soluble at least to a sufficient degree to gradually leach from the egg in use.

5. A bait egg according to claim 3 wherein said viscous coating contains a fish attracting odorant material transmitted to the water when the egg is in use.

6. A bait egg according to claim 3 wherein said comparatively light coloring is yellow and said darker coloring is red.

7. A bait fish egg according to claim 3 wherein said light coloring is yellow and said darker coloring is green.

8. A bait fish egg pack, comprising a multiplicity of bait fish eggs characterized by a distinctive coloring pattern according to claim 2.

9. A bait fish egg pack comprising a container, a container cover tightly fitting on said container, and bait fish eggs immersed in a dye solution in said container, said eggs being held under mechanical compression in said container so that substantially flattened areas of contact of the eggs with one another and with the container are maintained, the said dye solution thereby being substantially excluded from said areas of contact.

10. A bait fish egg pack according to claim 9, wherein said eggs have an artificially induced color characteristic when packed, and wherein said solution contains a dye of a different color from the color of the eggs when packed in said container, the dye carried by the solution having exhausted onto only the exposed areas of the eggs.

11. A bait fish egg pack according to claim 10, wherein said solution is of a viscous nature, resulting in the formation of a viscous coating on the exposed areas of said eggs.

12. A bait fish egg pack according to claim 10, wherein said solution contains a fish attracting odorant material.

13. A bait fish egg pack according to claim 9 wherein the total areas of contact of the eggs with one another and with the container constitute about 20 to about 80% of the total surface area of said eggs.

14. A bait fish egg pack according to claim 13, wherein the total area of said areas of contact approximate 50% of the total surface area of said eggs.

15. A bait fish egg pack according to claim 9, wherein the degree of mechanical compression is about 5 to about 20% as compared with the original, uncompressed total volume of the eggs.

16. A bait fish egg pack according to claim 15, wherein the degree of mechanical compression is about 10%.

17. A bait fish egg pack according to claim 12, wherein the viscosity of said solution is from about 10 centipoises to about 1000 centipoises at 70° F.

18. The method of artificially coloring fish eggs for use as bait to impart a distinctive coloring pattern thereto, comprising immersing the eggs in a chamber with a dye carrier solution so that the dye carrier solution substantially fills the interstices between the eggs, applying mechanical compression to the eggs to a degree so that substantially flattened areas of contact of the eggs with one another and with the container occur whereby such areas of contact are masked from the dye containing in said carrier solution, and maintaining such mechanical compression for a sufficient time to allow the dye in the carrier solution to color the egg surface areas exposed thereto but not the egg surface areas so masked.

19. The method of artificially coloring fish eggs for use as bait to impart a distinctive coloring pattern thereto, comprising immersing the eggs in a chamber with a viscous dye carrier solution so that the dye carrier solution substantially fills the interstices between the eggs, applying mechanical compression to the eggs to a degree so that substantially flattened areas of contact of the eggs with one another and with the container occur whereby such areas of contact are masked from the dye containing in said carrier solution, and maintaining such mechanical compression for a sufficient time to allow the dye in the carrier solution to color the egg surface areas exposed thereto and to allow the viscous dye carrier solution to form an adherent viscous coating on said exposed surface areas.

20. The method of artificially coloring fish eggs for use as bait to impart a distinctive coloring pattern thereto, comprising immersing the eggs in a dye carrier solution in the container in which the eggs are to be marketed, in a manner so that the dye carrier solution substantially fills the interstices between the eggs, the quantity of eggs being such as to substantially overfill the container, and applying a cover to the container to exert mechanical compression on the eggs to a degree so that substantially flattened areas of contact of the eggs with one another and with the container occur, masking such areas of contact from the dye containing in said carrier solution, such mechanical compression being maintained until the container is open for the purpose of using the bait eggs.

21. The method of artificially coloring fish eggs for use as bait to impart a distinctive coloring pattern thereto, comprising placing the eggs in a foraminous chamber, enclosing said chamber in a manner exerting substantial mechanical compression on the eggs to a degree so that substantial areas of contact of the eggs with one another and with the container occur, immersing the chamber and eggs in a non-viscous dye carrier solution in a manner so that the dye carrier solution substantially fills the interstices between the eggs, withdrawing the chamber from the dye carrier solution after the dye in the carrier solution has colored the surface areas of the eggs exposed thereto, and removing the eggs from the chamber.

22. A bait fish egg pack, comprising bait fish eggs having a distinctive coloring pattern formed by the method of claim 21.

23. A bait fish egg pack comprising a container, a container cover tightly fitting on said container, and bait fish eggs immersed in a dye solution in said container, said eggs being held under mechanical compression in said container so that substantially flattened areas of contact of the eggs with one another and with the container are maintained, the said dye solution thereby being substantially excluded from said areas of contact, and the said dye solution being approximately isotonic with respect to said eggs in order to avoid undue change in dimension of the eggs in the pack.

References Cited in the file of this patent

Fishery Leaflet 28, Dept. of Int., March 1950, pages 20–21.